May 26, 1970 G. A. FARRALL 3,514,636
TRIGGERING CIRCUIT FOR POWER SWITCHING VACUUM GAP DEVICE
Filed Oct. 11, 1965 3 Sheets-Sheet 1
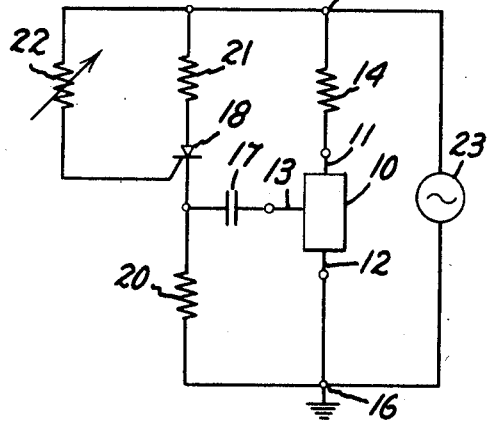
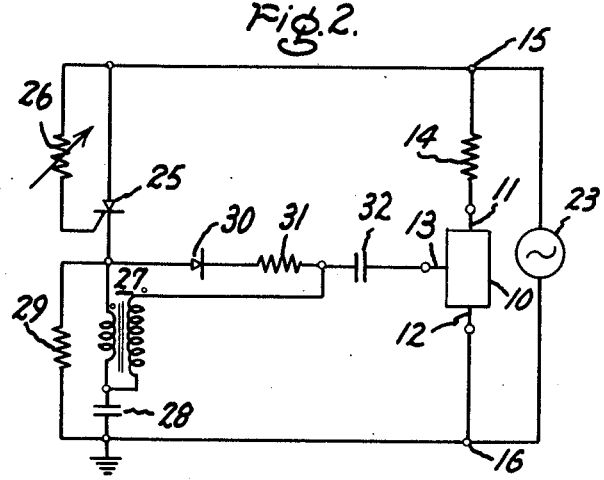
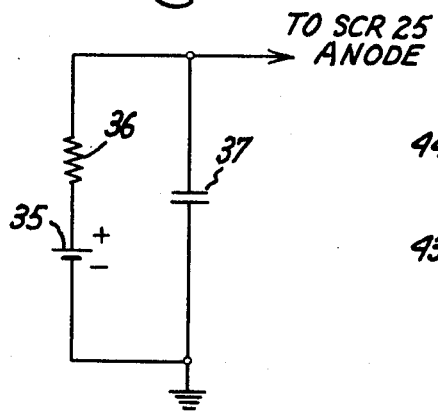
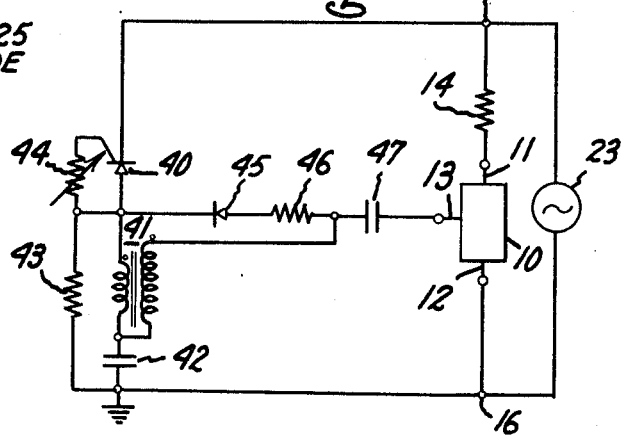
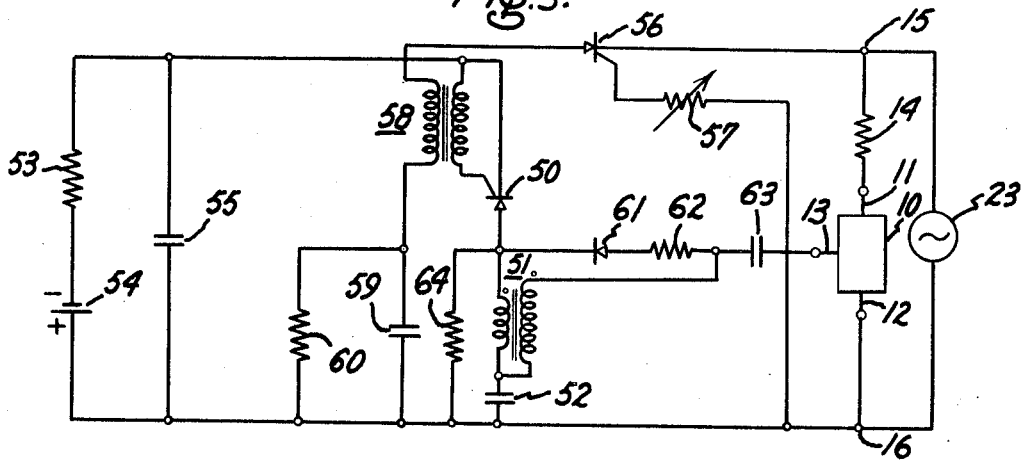
Inventor:
George A. Farrall,
by John F. Ahern
His Attorney.

Inventor:
George A. Farrall,
by John F. Ahern
His Attorney.

Inventor:
George A. Farrall,
by John F. Ahern
His Attorney.

United States Patent Office 3,514,636
Patented May 26, 1970

3,514,636
TRIGGERING CIRCUIT FOR POWER SWITCHING
VACUUM GAP DEVICE
George A. Farrall, Schenectady, N.Y., assignor to General
Electric Company, a corporation of New York
Filed Oct. 11, 1965, Ser. No. 494,464
Int. Cl. H03k 17/00
U.S. Cl. 307—252                                  8 Claims

ABSTRACT OF THE DISCLOSURE

Triggering circuits for a power switching vacuum gap device constrain trigger current to rise at substantially the same rate as anode or main gap current. This control is achieved by using a silicon controlled rectifier or other switching device wherein the initial instant of conduction occurs at a time largely determined by the characteristics of the circuit protected by the vacuum gap device. The trigger electrode of the vaccum gap device is energized throughout a predetermined interval in order to insure conduction through the main gap during the entire interval.

This invention relates to circuits for triggering power switching vacuum gap devices, and more particularly to circuits for providing, at any predetermined time, a current pulse to a trigger electrode in a power switching vacuum gap device operating in a low voltage power system.

Power switching vacuum gap devices such as described in J. M. Lafferty Pat. No. 3,087,092, issued Apr. 23, 1963, have been successfully applied to precise switching of extremely large voltages and current. These devices generally comprise, in one embodiment, a cathode electrode and an anode electrode spaced apart from each other in a vacuum environment within an evacuated envelope. The cathode and anode electrodes are fabricated of gas-free metal. A trigger electrode is positioned closely adjacent at least one of the cathode and anode electrodes, to establish within the gap between the cathode and anode electrodes a sufficient quantity of charged conduction carriers to cause electrical breakdown of the gap. This anode-to-cathode gap is hereinafter referred to as the "primary gap."

As described in the afore-mentioned Lafferty patent, the trigger electrode comprises a metallic member charged with an ionizable gas. Application of a trigger voltage across the gap between the trigger electrode and the electrode closely adjacent thereto initiates an electrical arc discharge across this gap, heating the trigger electrode which consequently evolves the ionizable gas into the primary gap. In this fashion, conductivity of the primary gap is abruptly increased.

Power switching vacuum gap devices have not heretofore been applied to switching power at low voltages; that is, voltages in the order of 120 volts. It has been discovered, however, that such device may be successfully operated from a low voltage power source if the trigger electrode is energized with a current pulse which rises at substantially the same rate as current produced by the power source. The present invention relates to means for accomplishing this result.

Accordingly, one object of the invention is to provide apparatus for triggering power switching vacuum gap devices operated at low anode-to-cathode voltages.

Another object is to provide circuitry for reliably triggering a power switching vacuum gap device in accordance with current supplied by the power source.

Another object is to provide circuitry for triggering a power switching vacuum gap device with a pulse of current rising at substantially the same rate as current produced by a power source energizing the anode and cathode electrodes of the device.

Another object is to provide a gating circuit for triggering a power switching vacuum gap devices driven from an alternating current source at a precise instant in the cycle.

Briefly, according to one aspect of the invention, there is provided a system for controlling conduction of a vacuum gap device having a trigger electrode and a pair of primary gap electrodes. The primary gap electrodes are energized by power supply means, while the trigger electrode is operated by circuit means in accordance with the voltage amplitude of the power supply means. The circuit means comprises gating means having load terminals and including control means for selectively rendering the gating means substantially conductive or substantially nonconductive, means energizing the control means in accordance with the voltage amplitude of the power supply means, means coupled to the load terminals for supplying energy to the gating means, and means coupling one of the load terminals to the trigger electrode of the vacuum gap device for selectively controlling the instant at which the device is rendered conductive.

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a schematic diagram of a circuit for triggering a power switching vacuum gap device having a low resistance trigger element;

FIG. 2 is a schematic diagram of a circuit for triggering on positive half cycles of AC power a power switching vacuum gap device having a high resistance trigger element;

FIG. 3 is a schematic diagram showing how the circuit of FIG. 2 may be modified to accomplish triggering from a DC power supply;

FIG. 4 is a schematic diagram of a circuit for triggering on negative half cycles of AC power a power switching vacuum gap device having a high resistance trigger element;

FIG. 5 is a schematic diagram of a circuit for triggering from a self-contained power supply on negative half cycles of AC power a power switching vacuum gap device having a high resistance trigger element;

Figure 6:
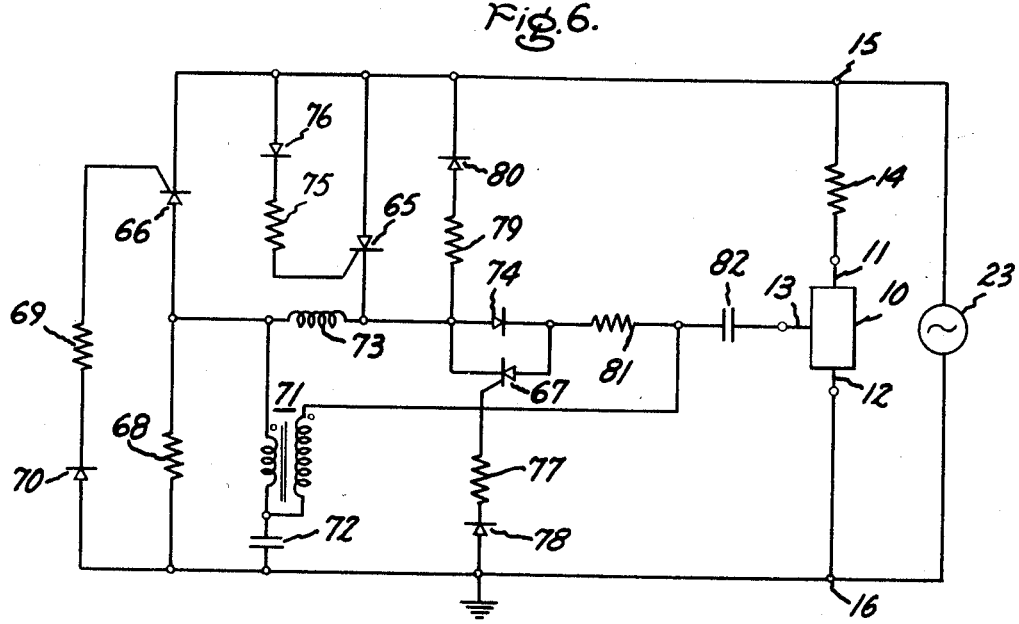
FIG. 6 is a schematic diagram of a circuit for triggering on positive and negative half cycles of AC power a power switching vacuum gap device having a high resistance trigger element.

In FIG. 1, there is shown a triggered vacuum gap device 10 having anode, cathode and trigger electrode elements designated 11, 12 and 13, respectively. Anode electrode 11 is connected in series with a load 14 to one side of an alternating current source 23 through a terminal 15. Cathode electrode 12 is connected to the other side of alternating current source 23 through a terminal 16, which may be grounded. Trigger electrode 13 is connected through a capacitor 17 to the cathode of a gating means such as controlled rectifier 18. This controlled rectifier is a three-terminal device comprising an anode, a cathode, and a gate or control electrode, and is preferably of the type known as silicon controlled rectifiers, hereinafter designated SCR. The cathode of SCR 18 is connected to terminal 16 through a cathode resistance 20, and the anode of SCR 18 is connected to terminal 15 through an anode resistance 21. The gate electrode of SCR 18 is connected to terminal 15 through a variable resistance 22 which is adjusted to control the instant at which SCR 18 is rendered conductive.

In operation, SCR 18 conducts an initial current, limited by the size of anode resistance 21, to trigger element 13 of vacuum gap device 10 through capacitor 17 each time terminal 15 swings positive with respect to terminal 16. This initial current, however, eventually decays essentially to zero, due to acquisition of charge by capacitor 17, so that the trigger element of vacuum gap device 10 need not carry a large continuous current any longer than required for triggering the device.

Cathode resistance 20 acts as a leakage path to discharge capacitor 17, while anode resistance 21 controls the rate at which capacitor 17 charges. Thus, if resistance 20 is large in relation to resistance 21, capacitor 17 charges during the first half cycle in which terminal 15 is positive with respect to terminal 16, and remains charged as long as power is applied to the circuit. Therefore, vacuum gap device 10 receives a trigger pulse only during the first positive half cycle of applied alternating current. If, however, resistance 20 is small, so that the RC time constant of resistance 20 and capacitor 17 is less than half the period of the alternating current frequency, capacitor 17 partially discharges during each negative half cycle. Thus, if resistance 21 is of the same order of magnitude as resistance 20, the circuit delivers a trigger pulse to vacuum gap device 10 during each positive half cycle, and consequently current flows through load resistance 14 during each positive half cycle.

The circuit of FIG. 1 is useful in a low voltage power system; that is, in a power system operating from AC voltage in the order of 120 volts RMS. However, the resistance value of trigger element 13 must here be relatively low, so that sufficient voltage is made available from the triggering circuit to break down the trigger element. Without such breakdown, very little current passes through the trigger element, and the gap fails to fire.

FIG. 2 is a schematic diagram of a circuit for triggering power switching vacuum gap device 10 from the power line on positive half cycles of alternating current, even if the resistance value of trigger element 13 is quite high. Thus, the anode of a controlled rectifier or SCR 25 is directly connected to terminal 15 of the AC line, and the control electrode of SCR 25 is connected to terminal 15 of the AC line through a variable resistance 26. The cathode of SCR 25 is connected through the primary winding of a voltage step-up transformer 27 in series with a blocking capacitor 28, which prevents DC saturation of the transformer windings, to terminal 16 of the AC line, which may be grounded. A cathode bias resistance 29 for SCR 25 is connected in parallel with the series combination of capacitor 28 and the primary winding of transformer 27. The cathode of SCR 25 is connected to trigger element 13 of vacuum gap device 10 through a series circuit comprising a diode 30 having its anode connected to the cathode of SCR 25, a current-limiting resistance 31 connected to the cathode of diode 30, and a capacitor 32 connected to resistance 31. One side of the secondary winding of transformer 27 is connected to the junction between the primary winding thereof and capacitor 28, while the other side is connected to the junction of resistance 31 and capacitor 32. Step-up transformer ± terminals are indicated by dots at appropriate ends of the transformer windings.

In operation, SCR 25 is nonconductive when terminal 15 is negative with respect to terminal 16. However, as terminal 15 becomes increasingly positive with respect to terminal 16, current flow through resistance 26 in series with the control electrode of SCR 25 and resistance 29 drives the SCR into conduction. At this instant, a transient current passes through the primary winding of transformer 27, momentarily inducing a high voltage across the secondary winding. This induced voltage is isolated from the primary winding by diode 30, and is sufficiently high to cause breakdown of trigger element 13 in the vacuum gap device, even if the trigger element resistance value is quite high.

After breakdown, the voltage at trigger element 13 drops to a low positive value due to conduction through the vacuum gap device. Diode 30 thus becomes forward-biased and conducts current from SCR 25 to trigger element 13, thereby extending the vacuum gap device conduction interval for a time limited by the sizes of capacitor 32 and resistance 31. Thus, throughout the interval in which SCR 25 conducts, capacitor 32 acquires a charge first from the secondary winding of transformer 27, and subsequently from diode 30. This charge tends to bias the cathode of SCR 25 in a positive direction. Hence, when the amplitude of positive voltage on terminal 15 begins to decrease, a level of voltage on the anode of SCR 25 is reached such that insufficient anode-to-cathode voltage remains on SCR 25 to continue conduction thereof. By preselecting the sizes of capacitor 32 and resistance 31, SCR 25 can be rendered nonconductive at a selected point in the AC cycle. Any charge accumulated on capacitor 28 during the conduction intervals of SCR 25 leaks off through resistance 29 during nonconduction intervals of the SCR.

Use of transformer 27 in combination with diode 30 permits generation of a transient voltage of amplitude which may be several times the available line voltage amplitude, in order to cause trigger element breakdown in the vacuum gap device. Assuming operation from an AC line of approximately 120 volts RMS, even a relatively low voltage, such as 100 volts, is capable of producing sufficient trigger current to maintain the primary gap discharge once such discharge has been established. This circuit may be used successfully with trigger elements having resistance values of several megohms.

In the event it is desired to operate SCR 25 of FIG. 2 from a self-contained power supply, the anode of SCR 25 is disconnected from terminal 15, and the circuit of FIG. 3 is connected to the SCR anode instead. The circuit of FIG. 3 comprises a DC power source 35 having its negative side grounded and its positive side connected through a current-limiting resistance 36 both to the anode of SCR 25 and to one side of a capacitor 37, the other side of which is grounded. Thus the anode of SCR 25 is continually energized by a positive voltage source which, when required, can produce additional current for a short period of time due to energy stored on capacitor 37.

FIG. 4 is a modification of the circuit of FIG. 2 for enabling a vacuum gap device having a high trigger element resistance value to be fired on negative half cycles of alternating current. In this embodiment, the cathode of a controlled rectifier, such as SCR 40, is connected to AC line terminal 15, and the anode of SCR 40 is connected to one side of the primary winding of a voltage step-up transformer 41, the other side of which is connected through a blocking capacitor 42 to AC line terminal 16. An anode bias resistance 43 for SCR 40 is connected in shunt with the series connection of capacitor 42 and the primary winding of transformer 41. A variable resistance 44 is connected between the control element of SCR 40 and the anode thereof, and by adjustment enables precise selection of the instant at which SCR 40 is rendered conductive. The anode of SCR 40 is connected to trigger element 13 of vacuum gap device 10 through a series circuit comprising a diode 45 having its cathode connected to the anode of SCR 40, a current-limiting resistance 46 connected to the anode of diode 45, and a capacitor 47 connected to resistance 46. One side of the secondary winding of transformer 41 is connected to the junction between the primary winding thereof and capacitor 42, while the other side of the secondary winding is connected to the junction of resistance 46 and capacitor 47.

Operation of the circuit of FIG. 4 is substantially similar to operation of the circuit of FIG. 2, with the exception that trigger voltage for the vacuum gap device is developed when AC line terminal 15 is negative with respect to terminal 16. Thus, when terminal 15 is positive with respect to terminal 16, the cathode of SCR 40 is positive with respect to the anode, and the SCR is consequently nonconductive. However, as terminal 15 becomes increasingly negative with respect to terminal 16, a forward bias is developed across the anode and cathode of SCR 40, and current also flows through resistances 43 and 44 in series through the control electrode of SCR 40. Depending upon the setting of resistance 44, SCR 40 begins conduction at a predetermined instant in the negative half cycle of alternating current. At this instant, a transient current flows through the primary winding of transformer 41, momentarily inducing a high voltage across the secondary winding. This induced voltage is isolated from the primary winding by diode 45, and is sufficiently great to cause breakdown of trigger element 13 in the vacuum gap device, even if the trigger element resistance value is quite high.

After breakdown, the voltage at trigger element 13 drops to a low negative value, due to conduction through the vacuum gap device. Diode 45 thus becomes forward-biased and conducts current from trigger element 13 to the anode of SCR 40. Capacitor 47 and resistance 46 limit duration of the trigger current pulse in the manner described in conjunction with capacitor 32 and resistance 31 of FIG. 2, and transformer 41 permits generation of a transient voltage, which is several times the available line voltage, to cause vacuum gap device trigger element breakdown. Again, assuming operation from an AC line of approximately 120 volts RMS, even a relatively low voltage, such as 100 volts, is capable of producing sufficient trigger current to maintain the primary gap discharge once such discharge has been established.

FIG. 5 is a schematic illustration of a circuit similar to that of FIG. 4, but modified to permit triggering from a DC power supply. This circuit utilizes a first controlled rectifier, such as SCR 50, having its anode connected through the primary winding of a voltage step-up transformer 51 in series with a blocking capacitor 52 to grounded terminal 16 of the AC line. An anode bias resistance 64 for SCR 50 is connected between the anode thereof and ground. The cathode of SCR 50 is connected through a current-limiting resistance 53 to the negative side of a DC power source 54, the positive side of which is grounded. A capacitor 55 is connected in shunt with the series combination of power source 54 and resistance 53, for the purpose of augmenting direct current from power source 54 in the manner described in conjunction with capacitor 37 of FIG. 3.

The cathode of a second controlled rectifier, such as SCR 56, is connected to AC line terminal 15, and the control electrode thereof is connected to AC line terminal 16 through a variable resistance 57 which selectively controls the instant at which conduction of SCR 56 is initiated. The anode of SCR 56 is connected through the primary winding of a coupling transformer 58 to one side of a bias resistance 60, the other side of which is grounded. A bypass capacitor 59 is connected in shunt with resistance 60 for the purpose of providing a low impedance path to transient currents from the primary winding of transformer 58 through resistance 60. The secondary winding of transformer 58 is connected across the cathode and control electrodes of SCR 50, for controlling conduction thereof.

The anode of SCR 50 is connected to trigger element 13 of vacuum gap device 10 through a series circuit comprising a diode 61 having its cathode connected to the anode of SCR 50, a resistance 62 connected to the anode of diode 61, and a capacitor 63 connected to resistance 62. In addition, the junction of resistance 62 and capacitor 63 is connected to one side of the secondary winding of transformer 51, the other side of which is connected to the junction of capacitor 52 and the primary winding of transformer 51.

Operation of the circuit of FIG. 5 is substantially similar to operation of the circuit of FIG. 4, in that SCR 50 is triggered into conduction during half cycles when AC line terminal 15 is negative with respect to terminal 16. At a point in each negative half cycle, determined by the setting of resistance 57, current flows from the terminal 16 through resistance 57 and the control electrode of SCR 56, biasing the control electrode positive with respect to the cathode thereof. Since positive bias is also supplied to the anode of SCR 56 through resistance 60 and the primary winding of transformer 58, SCR 56 is driven into conduction during each negative half cycle of line voltage, initiating a transient current through the primary winding of transformer 58 which causes voltage to momentarily appear across the secondary winding thereof. The secondary voltage on transformer 58 drives SCR 50 into conduction, firing the vacuum gap device in a manner identical to that described in conjunction with the circuit of FIG. 4. Thus, conduction of SCR 50 causes a high secondary voltage transient to be supplied by transformer 51 to trigger element 13 of vacuum gap device 10, thereby breaking down the trigger element and initiating a discharge within the tube. The associated decrease in negative voltage which occurs at trigger element 13 when the vacuum gap tube fires, forward-biases diode 61, so that current flows to the anode of SCR 50 first from the secondary winding of transformer 51 and subsequently from trigger element 13 of the vacuum gap device. Capacitor 63 and resistance 62 limit duration of the current pulse supplied to trigger element 13 of the vacuum gap device, in a manner similar to that described in conjunction with operation of capacitor 32 and resistance 31 in the circuit of FIG. 2. If the circuit of FIG. 5 is used with a low voltage AC power line, such as approximately 120 volts RMS, the transient voltage generated by the secondary winding of transformer 51 may be several times the available line voltage; however, once the primary gap discharge has been established, only a relatively low voltage, such as 100 volts, is required to produce sufficient trigger current to maintain the primary gap discharge.

In some applications, the triggered vacuum gap device may be required to fire regardless of line voltage polarity. To provide capability of triggering on either positive or negative line voltage polarity, circuits such as shown in FIGS. 2 and 4 might be connected in parallel, to trigger element 13 of the vacuum gap device. Such arrangement, however, requires that one circuit be a load for the other; thus, the output diode of one circuit, such as diode 30 in FIG. 2 or diode 45 in FIG. 4, is always in the forward conducting condition for output voltage to trigger element 13 produced by the other circuit. This condition would seriously limit the output voltage of both circuits. Hence, as a solution to this problem, the circuit of FIG. 6 may be used. This circuit requires three controlled rectifiers, such as SCR's 65, 66 and 67. The cathode of SCR 66 is connected to AC line terminal 15, and the anode thereof is connected through a bias resistance 68 to AC line terminal 16. The control electrode of SCR 66 is connected through a bias resistance 69 to the cathode of a diode 70, the anode of which is connected to terminal 16. Diode 70 prevents application of deleterious reverse bias to the control electrode of SCR 66.

The anode of SCR 66 is also connected both to one side of the primary winding of a voltage step-up transformer 71, the other side of which is connected through a capacitor 72 to terminal 16, and through a choke coil 73, to the anode of an output diode 74 and the cathodes of SCR's 65 and 67. The control electrode of SCR 65 is connected through a bias resistance 75 to the cathode of a diode 76, the anode of which is connected to the anode of SCR 65 and terminal 15. Diode 76 prevents application of deleterious reverse bias to the control electrode of SCR 65.

The control electrode of SCR 67 is connected through a resistance 77 to the cathode of a diode 78, the anode of which is connected to terminal 16. Diode 78 prevents application of deleterious reverse bias to the control electrode of SCR 67. Negative bias is supplied to the junction of the cathodes of SCR's 65 and 67 and the anode of diode 74 through a current-limiting resistance 79 from the anode of a diode 80, the cathode of which is connected to terminal 15.

One side of the secondary winding of transformer 71 is connected to the junction between the primary winding thereof and capacitor 72. The other side of the secondary winding is connected through a resistance 81 to the cathode of diode 74 and the anode of SCR 67, and through a capacitor 82 to trigger element 13 of vacuum gap device 10.

When terminal 15 is positive with respect to terminal 16, diode 80 and SCR's 66 and 67 are reverse biased, and hence nonconductive. Under these conditions, the circuit of FIG. 6 performs in a manner substantially identical to that of the circuit of FIG. 2.

When terminal 15 swings negative with respect to terminal 16, SCR 65 is reverse-biased, and hence rendered nonconductive. In addition, diode 74 maintains the anode-to-cathode potential of SCR 67 at a value too low to permit firing. However, forward bias is now applied across SCR 66 along with positive gate voltage, driving SCR 66 into conduction. A high voltage pulse which is consequently induced in the secondary winding of transformer 71 is capacitively coupled to trigger electrode 13 of vacuum gap device 10 through capacitor 82, triggering the vacuum gap device into conduction. Once the vacuum gap device fires, the voltage on trigger element 13 increases to a large positive value, causing the anode of SCR 67 to become positive with respect to the cathode. Hence, positive potential applied to the control electrode of SCR 67 through resistance 77 drives the SCR into conduction, permitting flow of trigger current from trigger element 13 through a series circuit comprising SCR 66, diode 73, SCR 67, resistance 81 and capacitor 82. Capacitor 82 thus acquires a charge which builds up to a sufficiently high value such that the anode-to-cathode voltage on either SCR 66 or SCR 67 becomes too small to maintain conduction thereof. Both SCR's 66 and 67 are thus rendered nonconductive, and trigger current flow ceases.

Figure 7:
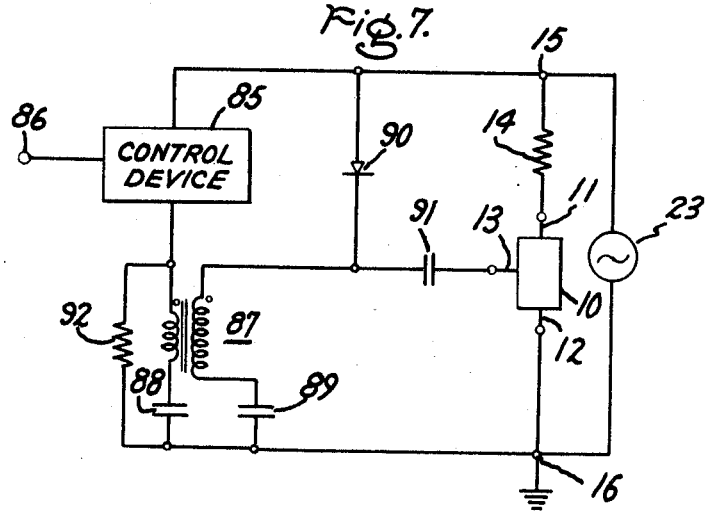
FIG. 7 is a schematic diagram of a circuit for triggering on positive half cycles of AC power a power switching vacuum gap device having a high resistance trigger element, wherein the switching device does not carry the entire trigger current.

FIG. 7 is a triggering circuit for a vacuum gap device, which is similar to the previously described triggering circuits with the exception that the control device is not required to carry full trigger current, which may be as high as 100 amperes for one type of vacuum gap device. In this circuit, a control device 85, which may be a controlled rectifier, such as an SCR, or any other electronic or electromechanical gating device controlled by application of a control parameter to a gating terminal 86, is connected in series with the primary winding of a voltage step-up transformer 87 and a capacitor 88 across AC line terminals 15 and 16. A resistance 92 is connected in shunt with the series combination of the transformer primary winding and capacitor 88 for the dual purpose of biasing control device 85, if required, and preventing accumulation of a net charge on capacitor 88.

One side of the secondary winding of transformer 87 is connected through a capacitor 89 to terminal 16, and the other side of the secondary winding is connected to the cathode of a diode 90, the anode of which is connected to terminal 15. The cathode of diode 90 is also coupled through a capacitor 91 to trigger element 13 of vacuum gap device 10. The primary and secondary windings of transformer 87 are each coupled to terminal 16 through separate capacitors 88 and 89 so that capacitor 88 cannot acquire a steady-state DC charge through diode 90 and thus interfere with switching of control device 85.

In operation, initial conduction of control device 85, due to application of a control parameter to gating terminal 86 when terminal 15 is positive with respect to terminal 16, causes flow of a transient current through the primary winding of transformer 87, inducing a high voltage at the secondary winding thereof. This high voltage, which is isolated from the AC line by diode 90, triggers vacuum gap device 10 into conduction. After trigger breakdown occurs, diode 90 transfers current directly from power source 23 to trigger element 13 until capacitor 91 becomes fully charged. Thus, full trigger current is carried by diode 90 rather than by control device 85. Moreover, the charge on capacitor 91 is quite small at the instant of triggering, since the trigger element itself has a high value of resistance; for example, a megohm or greater, in this embodiment. Hence, charging time for a typical value of capacitor 91 would be more than one minute.

In the event control device 85 is not polarity sensitive, but may be rendered conductive on either polarity of applied voltage, replacement of diode 90 by a reactance, such as an inductor for example, permits firing of vacuum gap device 10 on either polarity of AC line voltage. In such application, control device 85 may comprise a Triac, which is a solid-state gate-controlled AC switch, or contacts of a relay.

Figure 8:
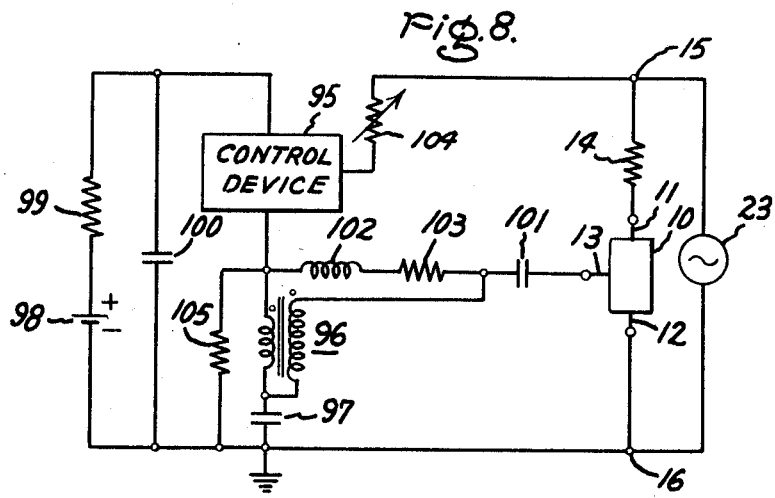
FIG. 8 is a schematic diagram of a circuit for triggering from a self-contained power supply on either positive or negative half cycles of AC power a power switching vacuum gap device having a high resistance trigger element.

FIG. 8 is a schematic diagram of a modification of the circuit represented by the embodiment of FIG. 3. A control device 95, which may be an SCR or Triac for example, is connected in series with the primary winding of a voltage step-up transformer 96 and a capacitor 97 across a control power supply comprising a DC source 98 in series with a current-limiting resistance 99. A storage capacitor 100 is connected across DC source 98 and resistance 99. One side of the secondary winding of transformer 96 is connected to the junction of the primary winding thereof and capacitor 97, while the other side of the secondary winding is connected both to trigger element 13 and of vacuum gap device 10 through a coupling capacitor 101, and to the junction of the primary winding of transformer 96 and control device 95 through a series RL circuit comprising inductor 102 and resistance 103. A gating input to control device 95 is supplied from AC line terminal 15 through a variable resistance 104. A resistance 105 completes the DC path for control device 95 between the junction common to control device 95 and the primary winding of transformer 96, and terminal 16.

It will be noted that inductor 102 replaces output diode 30, illustrated in FIG. 2. This inductor presents a high impedance to either polarity voltage transient developed on the secondary winding of transformer 96, preventing this transient from affecting the conductive condition of control device 95, while yet conducting a large current with a relatively slow rise to trigger element 13 from the control device. In all other aspects, operation of the circuit of FIG. 8 is essentially identical to operation of the circuit represented by the embodiment of FIG. 3. Substitution of an inductance, such as inductor 102, in place of the output diode in other previously described triggering circuits may also be advantageous.

The circuit of FIG. 8, which may be triggerable on either polarity, depending upon the nature of control device 95, may be modified by utilizing for control device 95 a light sensitive switching device, such as a light sensitive SCR, which is a controlled rectifier triggerable by a pulse of light. Thus, a neon lamp may be connected across terminals 15 and 16 to direct light flashes, occurring whenever the voltage across the terminals reaches ignition potential, upon the light sensitive SCR. Each flash of light renders the SCR conductive, and circuit operation takes place as hereinbefore described.

Figure 9:
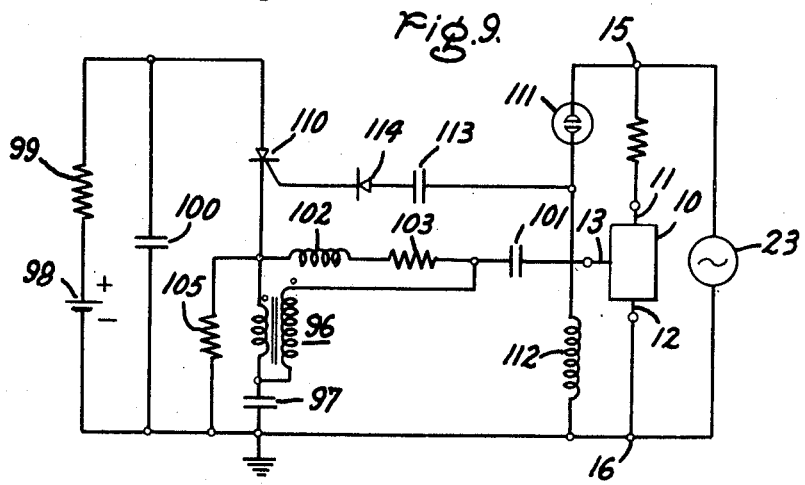
FIG. 9 is a schematic diagram of another embodiment of a circuit for triggering from a self-contained power supply on either positive or negative half cycles of AC power a power switching vacuum gap device having a high resistance trigger element.

FIG. 9 is a modification of the circuit of FIG. 8, utilizing a controlled rectifier, such as SCR 110, as the control device. A series circuit comprising a neon lamp 111 and an inductor 112 is connected across AC line terminals 15 and 16. The control electrode of SCR 110 is energized through a circuit comprising a capacitor 113 connected in series with a diode 114, from the junction of neon lamp 111 and inductor 112. Diode 114 is poled to provide positive control electrode pulses to SCR 110. Thus, when sufficient voltage of either polarity appears across terminals 15 and 16, neon lamp 111 is rendered conductive, causing abrupt application of voltage across inductor 112. The inductor oscillates with capacitor 113, so that alternate positive and negative voltage pulses are produced across the inductor regardless of the voltage polarity igniting neon lamp 111. The positive pulses produced across the inductor are applied to the control electrode of SCR 110 through diode 114 and capacitor 113, so that trigger element 13 of the vacuum gap device may be energized on either polarity of the AC line.

Figure 10:
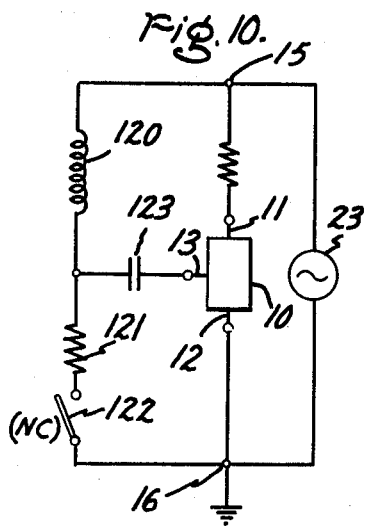
FIGS. 10, 11 and 12 are schematic diagrams of circuits for triggering a power switching vacuum gap device with a capacitor discharge on either positive or negative half cycles of AC power.
Figure 11:
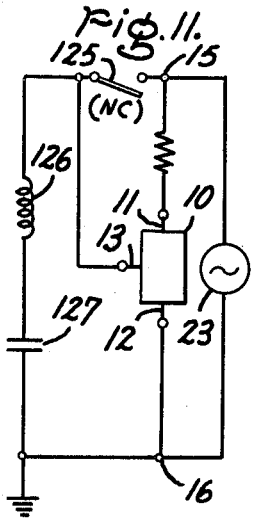
Figure 12:
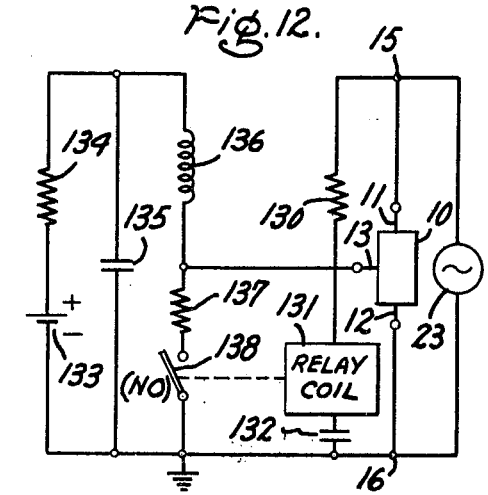

FIGS. 10, 11 and 12 are schematic diagrams illustrating electromechanical triggering apparatus for a vacuum gap device. FIG. 10 comprises a series circuit including an inductor 120, a current-limiting resistance 121 and a normally closed (N.C.) switch 122 which may be, for example, a circuit breaker with a bimetallic element, or other form of circuit breaker responsive to current flow therethrough, connected across AC line terminals 15 and 16. A capacitor 123 is connected between trigger element 13 of vacuum gap device 10 and the junction common to inductor 120 and resistance 121, for the purpose of limiting duration of trigger element current. Thus, when switch 122 opens, due to large current flow therethrough, energy stored in inductor 120 is released through capacitor 123 to trigger element 13, firing the vacuum gap device. When the voltage consequently built up on the capacitor reaches a predetermined value, trigger element current ceases. If desired, capacitor 123 may be replaced with a device such as a temperature sensitive resistor for the purpose of utilizing the resultant increase in resistance caused by flow of trigger element current to limit duration of trigger element current. Alternatively, a fuse wire may be utilized to accomplish this objective.

The circuit of FIG. 11 operates on the same basic principle as that of FIG. 10. Thus, a series circuit comprising a normally closed (N.C.) switch 125, an inductor 126 and a capacitor 127, is connected across AC line terminals 15 and 16. Switch element 125 represents a device similar to element 122 of FIG. 10. Trigger element 13 of the vacuum gap device is connected to the junction of inductor 126 and switch 125.

As voltage across terminals 15 and 16 increases, current flow through inductor 126 and switch 125 charges capacitor 127. However, after a brief interval, this current causes switch 125 to open, developing a high voltage across the inductor. This high voltage breaks down trigger element 13 of the vacuum gap device, causing capacitor 127 to discharge to the trigger element.

FIG. 12 illustrates a circuit for electromechanically triggering a vacuum gap device from a separate power supply. This circuit comprises a current-limiting resistance 130, a relay coil 131 and a capacitor 132, connected in series across AC line terminals 15 and 16. A storage capacitor 135 is connected across the series combination of a DC source 133 and a current-limiting resistance 134. A series circuit comprising an inductor 136, a current-limiting resistance 137 and a normally open (N.O.) contact 138 of relay coil 131, is connected in shunt with capacitor 135.

When voltage of either polarity is applied across terminals 15 and 16, relay coil 131 is actuated, closing contact 138 to thereby store energy in inductor 136. However, capacitor 132 rapidly acquires a charge, so that the voltage across relay coil 131 falls off rapidly, de-energizing the relay coil and opening contact 138 while the AC voltage on terminals 15 and 16 is close to maximum amplitude. This induces a large voltage across inductor 136, breaking down trigger element 13 of the vacuum gap device. Capacitor 135 subsequently discharges through inductor 136 to the trigger element, maintaining an arc discharge within the vacuum gap device for an interval dependent upon the size of capacitor 135 and the trigger element resistance value.

Figure 13:
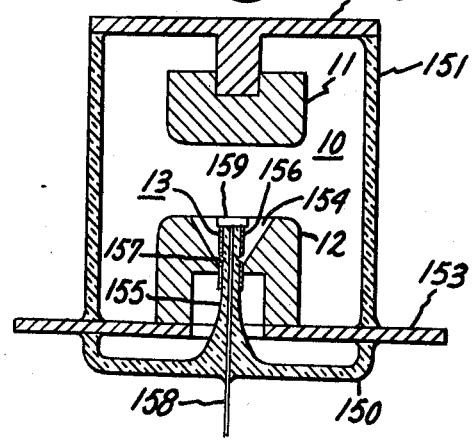
FIG. 13 is a simplified schematic diagram of a power switching vacuum gap device such as described in the afore-mentioned Lafferty patent, suitable for use with the circuits of FIGS. 1–12.

FIG. 13 represents, in schematic form, one type of power switching vacuum gap device which may be used with the circuits of FIGS. 1–12. The vacuum gap device 10, shown partially in section, comprises an anode 11 and cathode 12 fabricated of a metal such as copper, which is substantially free of gaseous impurities and impurities which, upon decomposition, may produce gases. The anode and cathode are enclosed within an envelope comprising a base 150 and sidewall 151 constructed of dielectric material, and an upper end plate 152 which is comprised of metal and forms both a support for anode 11 and an electrical connection thereto. The envelope is evacuated to a pressure of $10^{-5}$ millimeters of mercury, or less. The cathode is mounted on a metallic support disc 153 which provides an electrical connection to the cathode. Disc 153 and end plate 152 are hermetically sealed to sidewall 151 in order to maintain the vacuum.

Cathode 12 contains an aperture 154 which tapers outward toward the anode. Within this aperture, a projection 155 of ceramic base 150 is passed, and the innermost portion of this projection is coated with a thin layer 156 of a metal, such as titanium, which is charged with hydrogen. After layer 156 of titanium has been formed, a groove 157 is scored around the circumference of layer 156 and the underlying portion of projection 155 so as to remove the titanium and expose the insulating ceramic at this location. The position of groove 157 is located just above the point at which aperture 154 begins its outward taper. Below this point, cathode 12 and titanium coating 156 are in electrical contact. A conducting lead 158 is passed through projection 155 and is conductively secured to a metallic cap 159, which, in turn, is secured to titanium coating 156. This assembly comprises trigger electrode 13, which receives its voltage from lead 158.

In operation, a voltage in the order of 120 volts RMS, such as supplied by alternating current source 23 of FIG. 1 for example, is applied to end plate 152 and disc 153, so as to appear across anode 11 and cathode 12. This voltage may be discharged across the anode and cathode at any predetermined precise instant by applying a trigger voltage between cathode 12 and trigger electrode 13. This trigger voltage initiates an arc discharge across groove 157, heating titanium film 156, which consequently discharges hydrogen into the vicinity of the arc across the groove. The hydrogen becomes ionized, and a highly conducting arc is thus established across groove 157. Because of magnetic forces on the arc, it rapidly propagates itself upward along the tapered inner wall of aperture 154 until it reaches the edge thereof and establishes a cathode spot along the portion of cathode 12 that is parallel with the mating surface of anode 11. Since the electric field between the cathode and anode is greater than the field established by the trigger electrode-to-cathode voltage, the arc transfers to anode 11 and the primary gap between the anode and cathode breaks down, firing the vacuum gap device.

When the voltage applied to the primary gap falls essentially to zero, the discharge ceases, and the normal conduction carriers within the vacuum gap device disappear. These conduction carriers, which are essentially electrons and ionized copper atoms from the electrodes, diffuse to the surfaces within the device and are deionized. The hydrogen ions from the trigger gap are essentially reabsorbed by the titanium film as soon as the arc is transferred from the trigger electrode to the anode. Since the vacuum gap device is maintained to a hard vacuum and essentially no ionizable gases are present, the device rapidly recovers and is ready to perform a switching action almost immediately after extinction of the arc across the primary gap. For example, typical recovery times are from 25 to 100 microseconds after extinction of the anode-to-cathode arc.

The foregoing is a description of various embodiments of apparatus for triggering a power switching vacuum gap device, operated at low anode-to-cathode voltages, in accordance with current supplied to the device from an AC power source. The vacuum gap device is triggered at a precisely-determined instant with a pulse of current rising at substantially the same rate as current produced by the power source.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What I claim as new and desire to secure by Letters Patent of the United States is:

1. In a system for controlling conduction of a vacuum gap device having a trigger electrode and a pair of gap electrodes, said system including power supply means energizing said gap electrodes, circuit means for operating said trigger electrode in accordance with voltage amplitude of said power supply means, said circuit means comprising:
   gating means having load terminals and including control means for selectively rendering said gating means substantially conductive or substantially nonconductive;
   means energizing said control means in accordance with the voltage amplitude of said power supply means;
   transformer means including first and second windings thereon;
   means coupling said load terminals in a series circuit with said power supply means and the first winding of said transformer means; and
   means coupling the second winding of said transformer means to the trigger electrode of said vacuum gap device for selectively controlling the instant at which said vacuum gap device is rendered conductive, said means coupling the second winding of said transformer means to the trigger electrode including capacitive means to limit duration of current flow to said trigger electrode.

2. The system of claim 1 including means coupling said series circuit to said capacitive means for extending the conduction interval of said vacuum gap device.

3. The system of claim 2 wherein said means coupling said series circuit to said capacitive means for extending the conduction interval of said vacuum gap device includes unidirectional conducting means.

4. The system of claim 2 wherein said means coupling said series circuit to said capacitive means for extending the conduction interval of said vacuum gap device includes inductive reactance means.

5. In a system for controlling conduction of a vacuum gap device having a trigger electrode and a pair of gap electrodes, said system including power supply means energizing said gap electrodes, circuit means for operating said trigger electrode in accordance with voltage amplitude of said power supply means, said circuit means comprising:
   gating means having load terminals and including control means for selectively rendering said gating means substantially conductive or substantially nonconductive;
   means energizing said control means in accordance with the voltage amplitude of said power supply means;
   a source of direct current;
   means including a first winding of transformer means having first and second windings thereon and coupling said load terminals in a series circuit with said source of direct current;
   capacitive means coupled to the trigger electrode of said vacuum gap device for limiting duration of current flow to said trigger electrode; and
   means including the second winding of said transformer means coupling said series circuit to said capacitive means for selectively controlling the instant at which said vacuum gap device is rendered conductive.

6. In a system for controlling conduction of a vacuum gap device having a trigger electrode and a pair of gap electrodes, said system including power supply means energizing said gap electrodes, circuit means for operating said trigger electrode in accordance with voltage amplitude of said power supply means, said circuit means comprising:
   first and second controlled rectifiers, each of said controlled rectifiers having an anode and a cathode and including a control terminal for selectively rendering each respective controlled rectifier substantially conductive or substantially non-conductive;
   means coupling the control terminal of said first controlled rectifier to one side o fsaid power supply means;
   means coupling the control terminal of said second controlled rectifier to the other side of said power supply means;
   means coupling the anode of said first controlled rectifier and the cathode of said second controlled rectifier to said one side of the power supply means;
   transformer means including first and second windings thereon;
   means including the first winding of said transformer means coupling the anode of said second controlled rectifier and the cathode of said first controlled rectifier to said other side of the power supply means; and
   means coupling the second winding of said transformer means to the trigger electrode of said vacuum gap device for selectively controlling the instant at which said vacuum gap device is rendered conductive.

7. The system of claim 6 including additional circuit means coupling the anode of said second controlled rectifier and the cathode of said first controlled rectifier to the trigger electrode of said vacuum gap device for extending the conduction interval of said vacuum gap device.

8. In a system for controlling conduction of a vacuum gap device having a trigger electrode and a pair of gap electrodes, said system including power supply means energizing said gap electrodes, circuit means for operating said trigger electrode in accordance with voltage amplitude of said power supply means, said circuit means comprising:
   gating means having load terminals and including control means selectively rendering said gating means substantially conductive or substantially non-conductive; said control means comprising a relay contact;

means energizing said control means in accordance with the voltage amplitude of said power supply means;

means coupled to said load terminals for supplying energy to said gating means, said means supplying energy to said gating means comprising a source of direct current; and means coupling one of said load terminals to the trigger electrode of said vacuum gap device for selectively controlling the instant at which said vacuum gap device is rendered conductive.

References Cited

UNITED STATES PATENTS

| | | | |
|---|---|---|---|
| 2,444,921 | 7/1948 | Dawson et al. | 315—199 |
| 3,089,984 | 5/1963 | Randolph | 315—199 X |
| 3,207,994 | 9/1965 | Theodore et al. | 307—252 |
| 3,281,677 | 10/1966 | Baggott | 307—252 |
| 3,356,895 | 12/1967 | Krauss | 315—199 |

DONALD D. FORROR, Primary Examiner

R. C. WOODBRIDGE, Assistant Examiner

U.S. Cl. X.R.

315—199; 317—16; 378—91